United States Patent [19]
Albertson et al.

[11] Patent Number: 5,638,774
[45] Date of Patent: Jun. 17, 1997

[54] INTEGRATED TRANSMISSION OIL CONDITIONER AND COOLANT PUMP

[75] Inventors: William Conrad Albertson, Sterling Heights; Michael Reber White, Livonia; Michael Okal Harpster, Jr., Auburn Hills, all of Mich.

[73] Assignee: General Motors Corporation, Detroit, Mich.

[21] Appl. No.: 577,396

[22] Filed: Dec. 22, 1995

[51] Int. Cl.$^6$ ............................................. F01P 11/08
[52] U.S. Cl. ........................... 123/41.33; 123/196 AB
[58] Field of Search ........................... 123/41.31, 41.33, 123/196 AB; 165/916

[56] References Cited

U.S. PATENT DOCUMENTS

| | | | |
|---|---|---|---|
| 4,370,957 | 2/1983 | Skatsche et al. | 123/196 AB |
| 4,426,965 | 1/1984 | Patel | 123/196 AB |
| 4,520,767 | 6/1985 | Roettgen et al. | 123/41.1 |
| 4,793,302 | 12/1988 | Osborne et al. | 123/196 AB |
| 5,092,282 | 3/1992 | Danekas et al. | 123/41.21 |

*Primary Examiner*—Noah P. Kamen
*Attorney, Agent, or Firm*—Patrick M. Griffin

[57] ABSTRACT

An integrated coolant pump and transmission fluid heat exchanger comprises a single module bolted to the engine block. A primary liquid coolant circuit takes pressurized coolant from the pump, through the block, to the radiator and back. A small, separate heat exchanger sits within the module, within a parallel liquid coolant circuit that by passes the primary coolant circuit. Liquid coolant is picked off from the pump outlet by an inlet to the heat exchanger, and, after running through the heat exchanger, is returned to the main flow downstream of the radiator. Concurrently, transmission fluid is counter flowing through the same heat exchanger. Consequently, the parallel liquid flow through the heat exchanger does not interfere with the pressure in the main engine cooling flow. The direct, continual heat exchanger relationship between the two fluids in the heat exchanger allows the transmission to be either heated or cooled by the engine coolant, depending on the relative temperatures thereof.

1 Claim, 4 Drawing Sheets

INTEGRATED TRANSMISSION OIL CONDITIONER AND COOLANT PUMP

This invention relates to transmission oil coolers in general, and specifically to a transmission oil heat exchanger which both cools and, under certain circumstances, warms the transmission fluid, and which is also uniquely integrated into a vehicle coolant pump in such a way as to not affect normal engine coolant flow.

BACKGROUND OF THE INVENTION

Typical commercially available vehicle transmission fluid coolers are simply a plate type heat exchanger that is placed in one tank of the engine cooling radiator. External lines run back and forth from the transmission case to take hot transmission fluid to and from the radiator tank and the transmission oil heat exchanger. A separate coolant pump, typically called a water pump, circulates coolant through the engine block and the radiator to cool the engine. The radiator tank is used as a convenient heat sink, but that is the sole extent of the operational or structural cooperation between the engine and transmission cooling systems. Therefore, during engine warm-up, when the typical radiator thermostat is closed and coolant is not being pumped through the radiator (so as to allow the engine to warm up), transmission heat is simply statically dumped to a cold radiator tank.

Designs have been proposed, at least on paper, to structurally integrate engine oil coolers (but not transmission fluid coolers) with vehicle engine coolant pumps and systems. U.S. Pat. No. 4,370,957 to Skatsche shows a housing in which a centrifugal impeller 6 sends coolant to and through an adjacent oil cooler 10'. After flowing through and around the oil cooler 10', and picking up heat from the engine oil that is concurrently circulating therethrough, the engine coolant is sent out to a non-illustrated conventional engine block and, presumably, a radiator. While lengthy engine block to oil cooler lines are avoided by bolting the assembly directly to the engine block, a great drawback is that the oil cooler presents a constant, in series flow restriction to the engine coolant pump. Coolant cannot flow to the engine and radiator without passing through the restrictive oil cooler heat exchanger first. Another design, shown in U.S. Pat. No. 4,520,767 to Roettgen et al does not so much combine the oil cooler into the coolant pump structurally as it combines the engine and oil cooling systems, as well as an aftercooler. Two separate cooling "loops" are created, one for the engine, and one for the oil cooler, radiator and aftercooler. Coolant from the pump 40 is always directed first to and through the oil cooler 10. From oil cooler 10, coolant may, depending on the temperature dependent position of a so called bypass valve 52, flow through the radiator 16 and the aftercooler 20, or just through the aftercooler 20 (FIG. 3). This is a very complex system practically suitable only for large trucks, and suffers from the same drawback as the Skatsche design, in that coolant flowing to the radiator 30 from the pump 40 must first pass through the oil cooler 10. Despite the "by pass" valve, coolant from the pump never really bypasses the in series flow restriction created by the oil cooler 10.

SUMMARY OF THE INVENTION

The invention provides a structurally compact, integrated engine coolant pump and transmission fluid heat exchanger that does not present a constant, in series flow restriction to the coolant pump. In addition, the transmission fluid heat exchanger is combined with the engine cooling and vehicle heating system in a unique way that allows more than just one way heat flow across the heat exchanger.

In the preferred embodiment disclosed, a vehicle includes a conventional engine block with coolant passages, fluid driven automatic transmission, thermostatically operated radiator, and a heater core for heating the passenger space. A structural module designed to be bolted to the engine block includes an integral impeller cavity within which a conventional impeller spins. A centrifugal impeller of this type provides a relatively constant output pressure, independent of flow rate. Integral passages within the module provide a coolant return from the radiator to the center of the impeller cavity, an outlet from the impeller cavity to the engine block, and a return passage from the engine block to the module and ultimately back to the radiator. These passages define together a primary coolant circuit for the engine, similar to that which any liquid cooled engine must have.

In addition, however, the same module contains the transmission fluid heat exchanger, a compact cylindrical unit that sits within an integral cavity adjacent to the primary coolant circuit passages. Other integral passages within the module provide a secondary heat exchange circuit between the liquid engine coolant and the transmission fluid. Branching internally from the impeller cavity outlet, a liquid coolant inlet takes liquid coolant to the center of the heat exchanger. From the heat exchanger, a liquid coolant outlet takes liquid coolant back into the return passage from the engine block to the radiator. Also, integral to the module, inlet and outlet passages take transmission fluid from the transmission, over the outside of the cylindrical heat exchanger, and back to the transmission. The transmission fluid and liquid coolant are in hydraulically discreet, but heat exchanging, relation as they simultaneously flow through the heat exchanger.

Because of the placement of the heat exchanger and the interrelationship of the various passages of the primary and secondary circuits, several advantages are obtained. When the transmission fluid is hotter than the liquid coolant, which is most of the time during the engine's operation, the heat taken out of the transmission fluid is picked up by the liquid coolant at its coolest, most thermally efficient point, just after being cooled in the radiator. By the same token, the liquid coolant heated by the heat exchanger is dumped back into the main flow just upstream of the radiator, and does not adversely affect the engine temperature. Most importantly, the heat exchanger is truly in a "by passed" path relative to the main liquid coolant flow to the engine. That is, the transmission fluid heat exchanger is in parallel to, and not in series with, the main liquid coolant flow to the engine, and so does not disturb it or significantly decrease the pressure in the primary coolant circuit.

Another unique advantage of the invention is the way in which it interacts with the unique operating characteristics of the transmission and the thermostatically controlled radiator and heater core. At cold start, the radiator thermostat is closed and prevents flow of coolant from the engine block through the radiator, but not through the heater core. Liquid coolant is always flowing in its parallel, "by pass" circuit from the impeller cavity and through the heat exchanger. At the very beginning of cold start, the transmission fluid is heated, by the internal workings of the transmission, more quickly than the engine coolant in the block, even though the transmission is not yet fully "warmed up". For that short time, the transmission fluid heats the liquid coolant that is flowing through the heater core, though not through the radiator, thereby helping to more quickly heat the passenger space. This is heat that would, with a conventional in tank type of transmission cooler, just be dumped, in effect. Shortly into cold start, but before the transmission is fully warmed up, the engine warmed coolant temperature actually exceeds the transmission fluid temperature, so that the heat exchanger acts to warm up the transmission fluid, rather than cool it. Therefore, the transmission is warmed up more quickly to its most efficient operating temperature. When normal equilibrium is reached, after the radiator flow path has been re-opened, the transmission fluid is now substantially hotter than the liquid coolant cooled by the radiator. Thereafter, the heat exchanger serves to cool the transmission fluid, as a conventional cooler would.

DESCRIPTION OF THE PREFERRED EMBODIMENT

These and other advantages of the invention will appear from the following written description, and from the drawings, in which.

Figure 1:
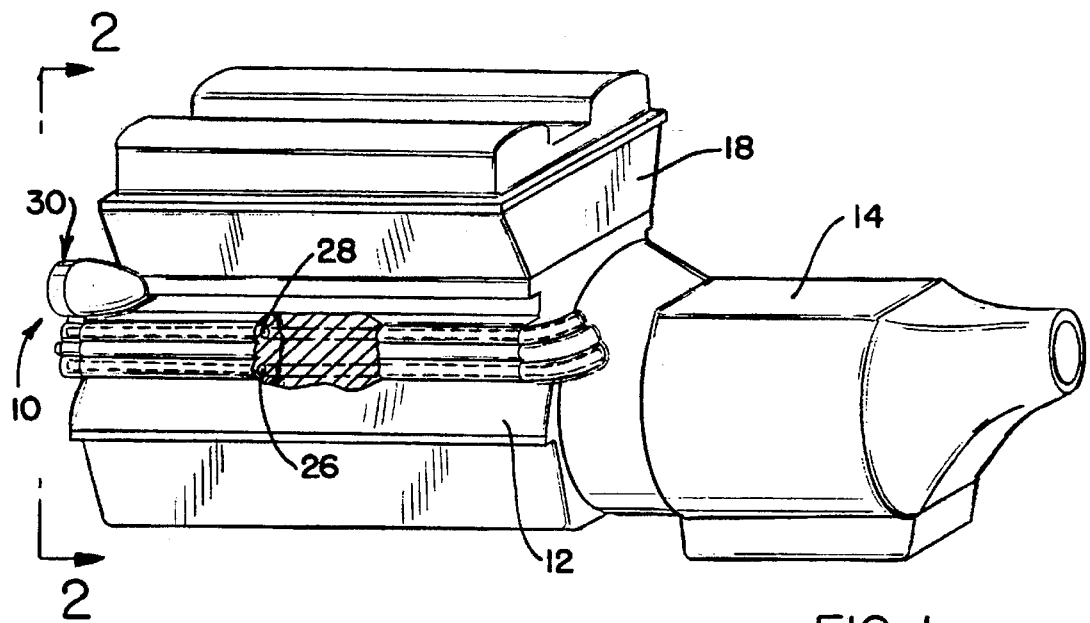
FIG. 1 is a perspective view of the rear of an engine block and transmission case.
Figure 2:
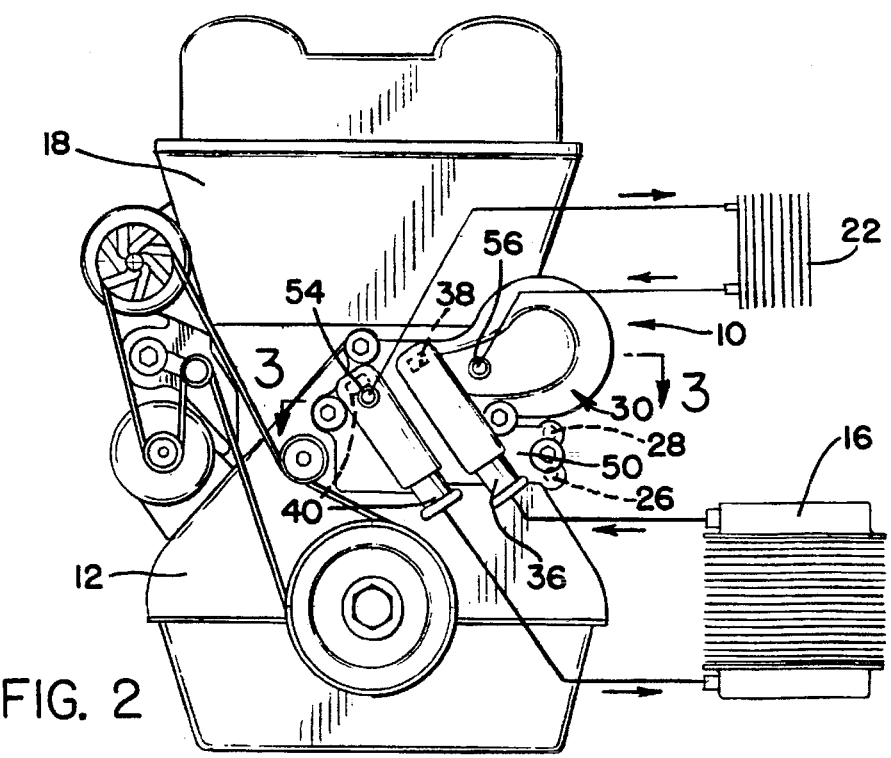
FIG. 2 is a view of the same engine block from the perspective of the plane represented by the line 2—2 of FIG. 1, showing a preferred embodiment of the invention mounted to the front of the block.
Figure 5:
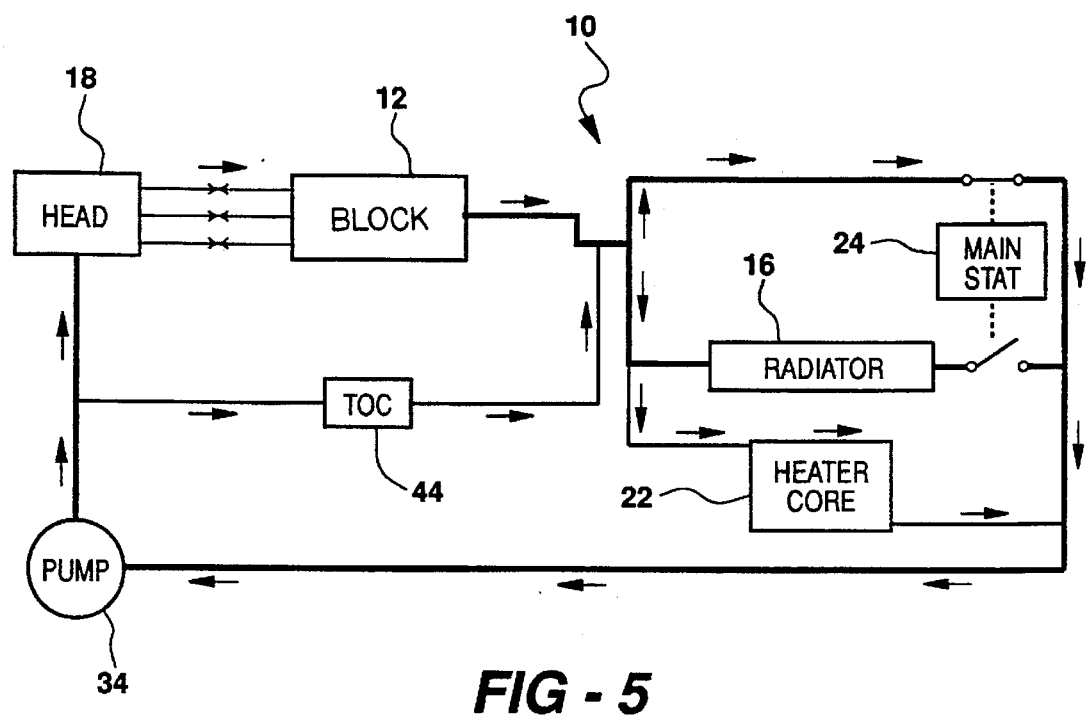
FIG. 5 is a schematic showing fluid flow at and just after cold start of the engine.

Referring first to FIGS. 1, 2 and 5, a preferred embodiment of the invention, indicated generally at 10, is shown in conjunction with a conventional engine block, indicated generally at 12, an automatic, fluid powered transmission 14 (conventionally rear mounted) and a radiator 16. An engine block head 18 would contain the usual liquid coolant passages and gasket orifices to and through which liquid coolant would be pumped, flowing down and into similar coolant passages in block 12. The coolant circulated to block 12 and through radiator 16 flows under the pressure provided by a pump integral to the invention 10, described in more detail below. In addition, a conventional vehicle cabin heater core 22, shown schematically in FIGS. 2, 5 and 6, operates in conjunction with the radiator 16. Radiator 16 is selectively opened or closed to the main coolant flow by a thermostat 24, which closes off the suction side of a primary coolant circuit to radiator 16 initially, when the engine is cold, and opens when the engine is hot enough to need cooling. This feature is described in more detail below. Flow always exists through heater core 22, however, as will also be detailed further below. Transmission fluid supply lines 26 and 28 run between the transmission 14 and the invention. Fluid flows through the lines 26 and 28 under pressure provided by the transmission 14, and carry heat either away from, or, in some cases, to the transmission 14. The lines 26 and 28 are shown as being integral to the block 12, and long, since the transmission 14 is at the back of block 12, and the invention 10 is mounted at the front. However, the lines 26 and 28 could be shorter if the transmission 14 were located elsewhere. The advantages of the invention 10, as described below, do not depend upon a specific location of either the transmission 14 or the radiator 16.

Figure 3:
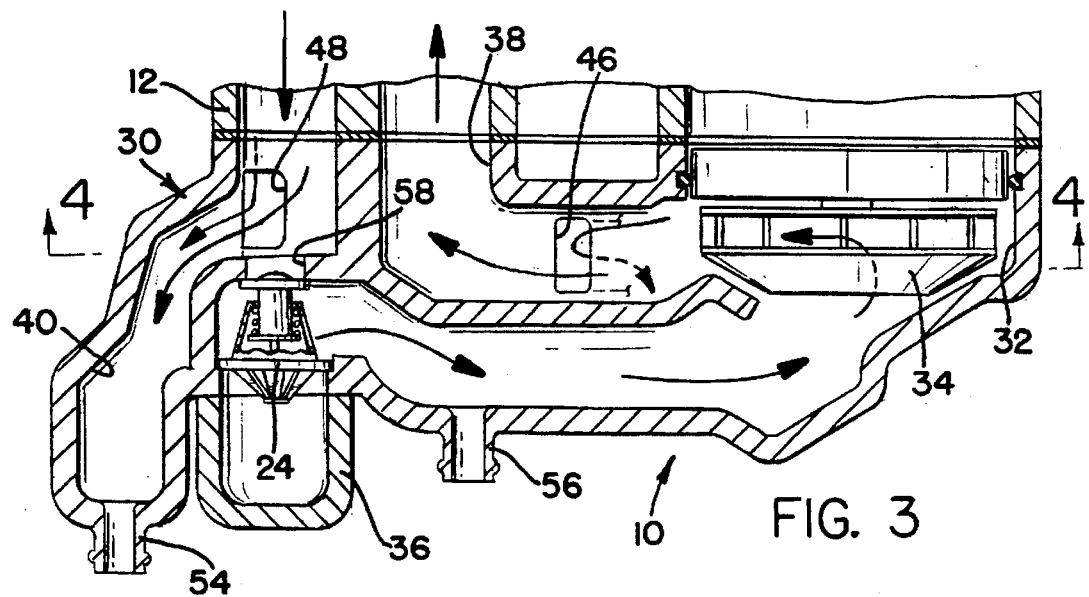
FIG. 3 is a cross section of the invention taken through the plane represented by the line 3—3 of FIG. 2.
Figure 4:
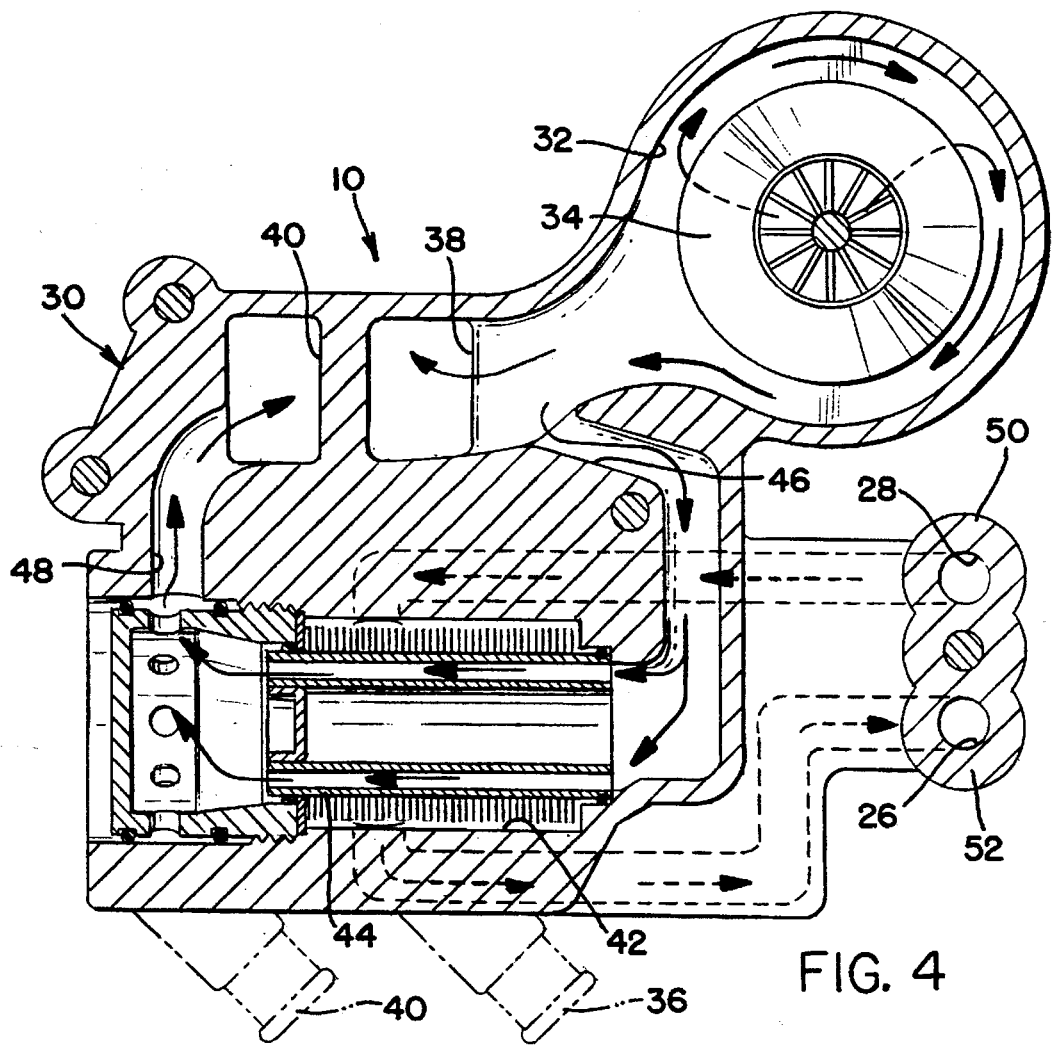
FIG. 4 is a cross section of the invention taken through the plane represented by the line 4—4 of FIG. 3.

Referring next to FIGS. 2, 3 and 4, the invention 10 has a main structural framework provided by a housing or module 30, which is a metal casting bolted to the face of block 12. Module 30 has numerous passages and cavities cast integrally into it, which provide floways for various fluids to and from block 12, transmission 14, radiator 16, heater core 22, and also contains several moving and nonmoving components. A round or dish shaped impeller cavity 32 contains a centrifugal impeller 34. From radiator 16, coolant returns to the center of impeller cavity 32 through a return 36 (which comprises an outlet from the radiator 16), where it can pass through thermostat 24, when thermostat 24 is open, but not, of course, when it is closed. From the center of impeller cavity 32, coolant under pressure is forced out through an impeller cavity outlet 38 and directly into the engine block 12, to which module 30 is bolted. The nature of impeller 34 is such that it provides a substantially constant pressure output at any flow rate, and the invention, described in more detail below, takes advantage of that fact. After cooling the engine block 12 and head 18, hot coolant is routed to module 30 through return 40, which also constitutes an inlet to the radiator 16, to complete the cycle. These various passages and returns 36, 38 and 40, constitute a primary coolant circuit for block 12 that is fairly typical for any liquid cooled engine.

Still referring to FIGS. 2, 3 and 4, module 30 also contains a secondary heat exchange circuit consisting of several cast in cavities and passages that provides improved temperature conditioning of the transmission fluid, as well as other advantages, in a very compact unit. A generally cylindrical heat exchanger cavity 42 contains a generally cylindrical transmission fluid heat exchanger 44, which is a commercially available type known as a Laminova type cartridge. Heat exchanger 44 allows for the simultaneous, hydraulically discrete, but thermally conductive, flow of two liquids, one through the center, and one over the exterior. Those two fluids, here, are liquid coolant and transmission fluid. The liquid coolant passed through heat exchanger 44 is that which has just returned from radiator 16 and been forced out by impeller 34 into impeller cavity outlet 38, on its way to engine block 12, which is its coolest point. Some of the main engine flow is picked off or "bypassed" to the heat exchanger 44 through a coolant inlet 46 that branches internally from impeller cavity outlet 38. From inlet 46, coolant flows through the center of heat exchanger 44, from bottom to top through a sleeve like central annular space, as shown by the arrows. From the top of heat exchanger cavity 42, a coolant outlet 48 opens internally back into the engine block return (radiator inlet) 40 of the primary coolant circuit, as shown by the arrows. In summary, the coolant that is bypassed out of the main flow and through the heat exchanger 44 is diverted from a coolest point, does not pass through the engine block 12, and is dumped back into the main flow just upstream of the radiator 16. As such, the heat exchanger 44 is entirely parallel to, and not in series with, the coolant that is pumped into the main engine flow by impeller 34. The remainder of the secondary heat exchange circuit consists of an integral transmission fluid inlet 50 (connected to transmission line 28) and a fluid outlet 52 (connected to transmission line 26). The inlet 50 and 52 feed transmission fluid to and from the interstitial spaced between heat exchanger cavity 42 and over the finned outer surface of heat exchanger 44, which is sealed from the sleeve like inner space. This allows hydraulically discrete heat exchange between the transmission fluid and the simultaneously flowing liquid coolant. The direction of the heat exchange, of course, depends on the relative temperature of the two fluids, as described in more detail below.

Referring again to FIGS. 2, 3 and 4, the embodiment of the module 30 shown also provides a separate and independent liquid coolant flow circuit to and from the standard design heater core 22, which operates continually. Branching off internally from the engine block coolant return (radiator inlet) 40 is a heater inlet 54, and re-entering the impeller cavity return (radiator outlet) 36 is a heater outlet 56. The heater inlet 54 and outlet 56 run to and from the heater core 22. In addition, there is a pressure relief port 58 in module 30, running directly between the radiator outlet 36 and radiator inlet 40. The thermostat 24 is designed to open pressure relief port 58 at such time as it closes off the suction side of the primary coolant circuit, that is, when it closes off the radiator outlet 36, for reasons described below.

Figure 7:
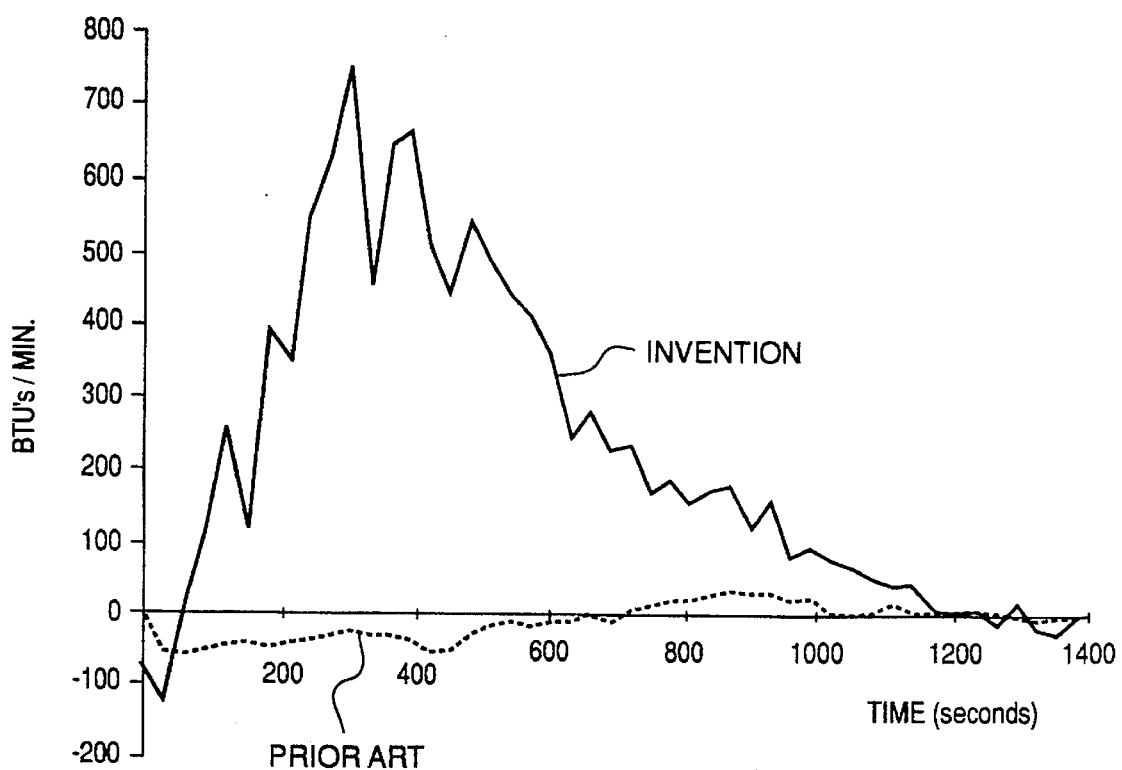
FIG. 7 is a graph indicating heat flow over time to or from the transmission, comparing the invention to a conventional, in tank type of transmission fluid cooler.

Referring next to FIGS. 5 and 7, the fluid and heat flow patterns provided by the invention under various conditions are schematically shown. Considering the first 50 seconds of the graph in FIG. 7, which is the interval just at and after cold start, the thermostat 24, is closed, blocking the radiator outlet 36, and thereby blocking return flow from the radiator 16 to the impeller cavity 32. This allows the engine block 12 to warm up more quickly at a time when it does not need cooling by radiator 16. However, the independent coolant flow circuit to the heater core 22 is always open, and the impeller 34 is still circulating coolant therethrough, as shown by the flow arrows in FIG. 5. Clearly, the impeller 34 has enough power to circulate more coolant through heater core 22 than it needs, so the open pressure relief port 58 allows the excess coolant pressure produced by impeller 34 to bleed directly from radiator inlet 40 to impeller 34, rather than all flowing through heater core 22. Concurrently, the secondary heat exchange circuit to the internal heat exchanger 44 is always open, also shown by the arrows. As the vehicle begins to move, a good deal of heat is produced within transmission 14 by its internal workings, and the transmission fluid actually heats up more quickly than does the liquid coolant that is circulating through the block 12 (but not circulating through the radiator 16 at this point). Consequently, as the two fluids circulate concurrently through the heat exchanger 44, the liquid coolant is actually warmed by transmission fluid, and vice versa. In FIG. 7, for the first 50 seconds, the line marked "invention" runs below the 0 line. Negative BTU's over this interval indicates that heat is being removed from the transmission 14. While the transmission fluid does not really need cooling during this initial interval, a conventional, in tank type of transmission oil cooler (shown by the dotted line) also cools the transmission during this initial interval, but it simply dumps the heat so removed to the cold radiator tank.

Figure 6:
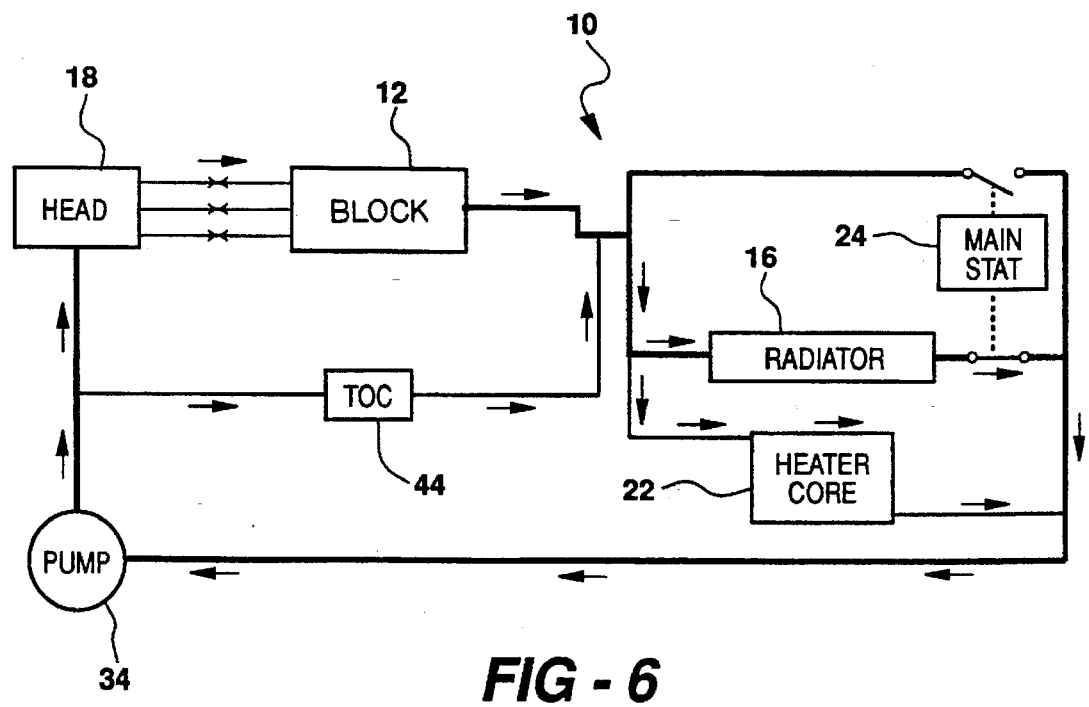
FIG. 6 is the same schematic showing fluid flow during warm operation of the invention.

Referring next to FIGS. 6 and 7, the thermostat 24 would typically close after about 10 minutes, re-establishing the connection between the primary coolant circuit and the radiator 16, after the engine block 12 and the liquid coolant therein have warmed up enough to require cooling by radiator 16. This is basically temperature, not time dependent, however, and has no effect on the secondary heat exchanger circuit, which is always open. As the liquid coolant quickly warms up in the engine block, it is, for a while, actually hotter than the transmission fluid. Consequently, for the next 18 or 19 minutes after the first minute of cold start, the invention operates very differently from a conventional, in tank transmission fluid cooler. The always flowing heat exchanger 44 actually warms the transmission fluid and, as can be seen in FIG. 7 by the sharp rise of the solid line above 0, adds a good deal of heat to the transmission 14. Over this interval, this actually warms transmission 14 up more quickly than it otherwise would from just its own internal workings, reducing its spin losses and increasing its efficiency. Over the comparable interval, as can be seen by the dotted line in FIG. 7, a conventional transmission fluid cooler generally only cools the transmission, adding only a little heat thereto, and that over a brief interval. This is a very different aspect of the operation of the invention, so much so that it may be referred to as a transmission fluid conditioner, rather than just a cooler.

Referring still to FIGS. 6 and 7, at the point where the transmission fluid has become hotter than the liquid coolant, which is the point where the transmission fluid requires cooling for efficient operation, the solid line drops below the 0 line, and heat is removed. This is shown occurring at about 1200 seconds. The flow in and around heat exchanger 44 does not change at this point in time, only the relative temperature difference of the two fluids circulating therethrough changes. From that point on, the invention operates much as a conventional, in tank cooler, but actually removes heat more efficiently for most of the time, as seen by the fact that the solid line is below the dotted line more than it is above. And, importantly, during its entire operation, the heat exchanger 44, since it is located in the secondary, parallel heat exchanger circuit, sees only flow diverted from the main flow of liquid coolant. It does not represent an in series detriment to the pressure of the main flow through block 12 and radiator 16.

As has been seen, the advantages of the invention are many. The compactness of the heat exchanger 44 is an advantage in and of itself, as compared to a conventional in tank unit, and its location right within the module 30 avoids running transmission fluid lines to the radiator tank and back. The direct, continual thermal contact between liquid coolant and transmission fluid in heat exchanger 44 allows the system to switch from heating to cooling the transmission automatically, as the relative temperatures change. The separate and independent heater flow circuit allows the initial use of otherwise initially wasted transmission heat. Even without the independent heater flow circuit, the invention still provides the advantages of a compact structure integrated into the module 30, and the continual heat exchange flow between liquid coolant and transmission fluid in the heat exchanger 44. This continual liquid flow allows the two way heat flow which in turn allows the engine heat to efficiently and directly warm up the transmission's internal workings for the initial period shown in FIG. 7. Therefore, it will be understood that it is not intended to limit the invention to just the embodiment disclosed.

We claim:

1. In an automotive vehicle having a liquid cooled engine block, a radiator, and a fluid driven automatic transmission, a combination engine block coolant pump and transmission fluid temperature conditioner, comprising, a module secured to said engine block having an integral impeller cavity containing a centrifugal impeller, said module defining a primary coolant circuit including a radiator to impeller cavity return, an impeller cavity outlet to said engine block, and an engine block return to said radiator, said module also having an integral transmission fluid heat exchanger cavity containing a transmission fluid to liquid coolant heat exchanger, said module also defining a secondary heat exchange circuit including an integral heat exchanger liquid coolant inlet branching internally from said impeller cavity outlet, an integral heat exchanger liquid coolant outlet opening internally to said engine block return, an integral heat exchanger transmission fluid inlet, an integral heat exchanger transmission fluid outlet, so as to divert a portion of liquid coolant from said impeller cavity outlet, upstream of said engine block, whereby, said diverted liquid coolant flow through said heat exchanger by passes said primary engine block cooling circuit, substantially preserving pressure in said primary coolant circuit, while continually maintaining the heat transfer path between transmission fluid and liquid coolant.

* * * * *